No. 877,372. PATENTED JAN. 21, 1908.
W. H. REXER.
DIPPER.
APPLICATION FILED MAY 25, 1906.
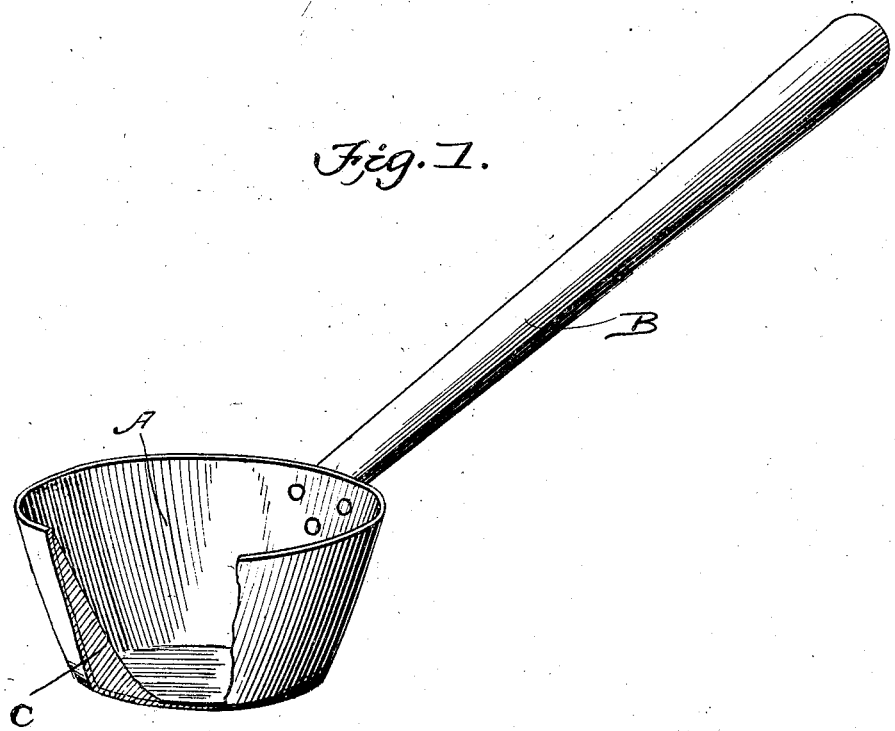
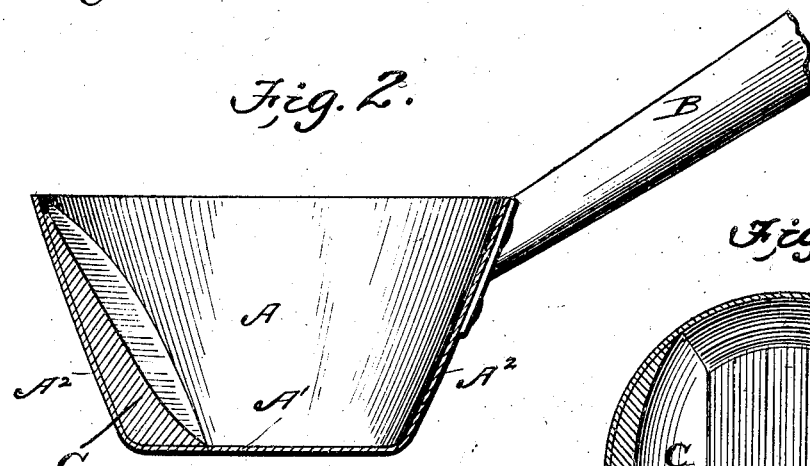
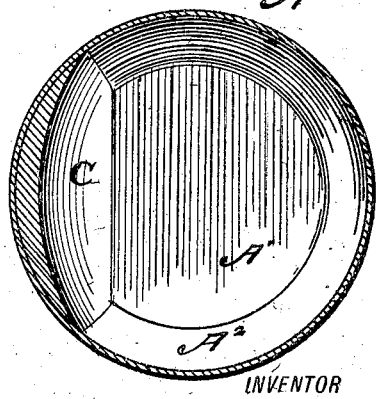
WITNESSES:
INVENTOR
W. H. Rexer.
BY
Attorneys

UNITED STATES PATENT OFFICE.

WILLIAM H. REXER, OF DEGRAFF, OHIO.

DIPPER.

No. 877,372.     Specification of Letters Patent.     Patented Jan. 21, 1908.

Application filed May 25, 1906. Serial No. 318,722.

*To all whom it may concern:*

Be it known that I, WILLIAM H. REXER, a citizen of the United States, residing at Degraff, in the county of Logan, in the State of Ohio, have invented a useful Improvement in Dippers, of which the following is a specification.

This invention is an improved construction of dipper the object being to provide a dipper which will always rest flat and thereby maintain the handle in the proper position. At the present time dippers are usually constructed in such a manner that the bowl does not rest flat and in case the dipper is left in the can or other receptacle the handle is permitted to sink letting the entire dipper drop down into the liquid contained in the vessel.

The invention consists also in certain details hereinafter fully explained and pointed out in the claims.

In the drawings forming a part of this specification; Figure 1 is a view showing the practical application of my invention. Fig. 2 is a vertical sectional view of the dipper bowl, the handle being shown in elevation. Fig. 3 is a horizontal sectional view of the bowl, the handle being omitted.

In carrying out my invention I employ a bowl A to which the handle B is attached. The bowl A and handle B may be made of any suitable material and either punched or molded as preferred and they may be made integral or separate. The bowl A is provided with a flat bottom A' and outwardly inclined side walls A² and upon the inner face of the side directly opposite the handle I arrange a certain amount of metal C the weight of which is in excess of the weight of the handle B so that the bowl will always be held in a flat position and thereby maintain the handle in an elevated position. If the bowl of the dipper is made of sheet metal this weight C is placed in there after the bowl has been shaped, but if the bowl is made of cast metal the proper amount of metal is cast in with the bowl at the same time thereby throwing the excess of weight at the proper point. It will be noted that the mass of metal C gradually tapers to the upper edge of the bowl and is concave so as to permit the contents of the dipper to be readily poured there from. It will thus be seen that I provide a novel form of dipper which can be used exactly the same as an ordinary dipper but which will always be maintained in a definite position and will hold the handle in a convenient position for grasping.

Having thus described my invention, what I claim as new and desire to protect by Letters Patent is:—

A dipper comprising a bowl having a flat bottom and inclined side walls, a handle secured to one side of said wall adjacent its upper edge and a curved tapering mass of metal having a flat bottom arranged upon the interior of the bottom of the bowl, against the wall opposite the handle, said mass of metal having a weight greater than the weight of the handle whereby the handle will be maintained in an upwardly extending position.

WILLIAM H. REXER.

Witnesses:
   J. F. REXER, Jr.,
   W. C. HANCE.